United States Patent
Taguchi

(10) Patent No.: US 11,694,112 B2
(45) Date of Patent: Jul. 4, 2023

(54) MACHINE LEARNING DATA MANAGEMENT SYSTEM AND DATA MANAGEMENT METHOD

(71) Applicant: Hitachi, Ltd., Tokyo (JP)

(72) Inventor: Yuichi Taguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 663 days.

(21) Appl. No.: 16/808,598

(22) Filed: Mar. 4, 2020

(65) Prior Publication Data
US 2021/0125099 A1    Apr. 29, 2021

(30) Foreign Application Priority Data
Oct. 23, 2019  (JP) .................... 2019-192920

(51) Int. Cl.
*G06F 16/25* (2019.01)
*G06N 20/00* (2019.01)
*G06N 5/02* (2023.01)
*G06F 16/21* (2019.01)

(52) U.S. Cl.
CPC ........... *G06N 20/00* (2019.01); *G06F 16/219* (2019.01); *G06F 16/25* (2019.01); *G06F 16/254* (2019.01); *G06N 5/02* (2013.01)

(58) Field of Classification Search
CPC .......... G06N 20/00; G06N 5/02; G06F 16/21; G06F 16/25; G06F 3/0605; G06F 3/0658; G06F 3/0683
See application file for complete search history.

(56) References Cited

U.S. PATENT DOCUMENTS

| | | | |
|---|---|---|---|
| 8,489,632 B1 * | 7/2013 | Breckenridge | G06F 16/2465 707/777 |
| 9,405,756 B1 | 8/2016 | Xavier et al. | |
| 2019/0171960 A1 * | 6/2019 | Sanchez | G06N 7/005 |
| 2019/0172564 A1 * | 6/2019 | Chandra | G06N 20/00 |
| 2020/0019558 A1 * | 1/2020 | Okorafor | G06F 21/6254 |
| 2020/0065342 A1 * | 2/2020 | Panuganty | G06F 16/632 |
| 2020/0349468 A1 * | 11/2020 | Arya | G06F 16/953 |

* cited by examiner

*Primary Examiner* — Tyler J Torgrimson
*Assistant Examiner* — Maher N Algibhah
(74) *Attorney, Agent, or Firm* — Mattingly & Malur, PC

(57) ABSTRACT

The data analysis server manages first data configuration information for managing a correspondence of the learned data model, a raw data bucket that stores the raw data for generating the learned data model, and a curated data bucket that stores the curated data for generating the learned data model and second data configuration information for managing correspondences of the learned data model and the first storage area, the curated data bucket and the second storage area, and the raw data bucket and the third storage area, and gives an instruction to acquire snapshots of the second storage area that stores the curated data for generating the learned data model and the third storage area that stores the raw data for generating the learned data model to the data storage via the storage management server when the learned data model is generated.

10 Claims, 17 Drawing Sheets

FIG. 7

STORAGE CONFIGURATION
MANAGEMENT INFORMATION 331

| Target ID (71) | LUN (72) | LDEV (73) |
|---|---|---|
| 192.168.1.2 | LU06 | DEV01 |
| 192.168.1.3 | LU04 | DEV02 |
| 192.168.1.3 | LU05 | DEV03 |
| 10.1.111.2 | LU01 | DEV04 |
| 10.1.111.2 | LU02 | DEV05 |
| 10.1.111.2 | LU03 | DEV06 |
| ... | ... | ... |

FIG. 8

SNAPSHOT MANAGEMENT
INFORMATION 333

| LDEV (81) | Snapshot (82) | Datetime (83) |
|---|---|---|
| DEV01 | SS08 | Apr.1.2019 |
| DEV01 | SS09 | Jan.1.2019 |
| DEV01 | SS10 | Oct.25.2018 |
| DEV02 | SS05 | Apr.1.2019 |
| DEV02 | SS06 | Jan.1.2019 |
| DEV04 | SS01 | Apr.1.2019 |
| DEV04 | SS02 | Oct.25.2018 |
| DEV04 | SS03 | Feb.3.2017 |
| ... | ... | ... |

FIG. 9

| To Data Model | Data Store | From Curated Data Bucket | Datetime |
|---|---|---|---|
| M01 | /mnt/str01 | C01 | Apr.1.2019 |
| M02 | /mnt/str01 | C02 | Jan.1.2019 |
| M03 | /mnt/str01 | C02 | Apr.1.2019 |
| ... | ... | ... | ... |

| To Curated Data Bucket | From Raw Data Bucket |
|---|---|
| C01 | R01 |
|  | R02 |
| C02 | R03 |
| ... | ... |

| To Raw Data Bucket | From Data Source |
|---|---|
| R01 | S01 |
| R02 | S02 |
| R03 | S03 |
| ... | ... |

| Data Store | Device | Target ID | LUN |
|---|---|---|---|
| /mnt/str01 | /dev/sda01 | 192.168.1.2 | LU06 |
| C01 | /dev/sdc01 | 192.168.1.3 | LU04 |
| C02 | /dev/sdc02 | 192.168.1.3 | LU05 |
| R01 | /dev/ext01 | 10.1.111.2 | LU01 |
| R02 | /dev/ext02 | 10.1.111.2 | LU02 |
| R03 | /dev/ext03 | 10.1.111.2 | LU03 |
| ... | ... | ... | ... |

| Group | Data | Datetime | Snapshot ID |
|---|---|---|---|
| G01 | M01 | Apr.1.2019 | SS08 |
| | C01 | Apr.1.2019 | SS05 |
| | R01 | Apr.1.2019 | SS01 |
| G02 | M02 | Jan.1.2019 | SS09 |
| | C01 | Jan.1.2019 | SS06 |
| G03 | M03 | Oct.25.2018 | SS10 |
| | R01 | Oct.25.2018 | SS02 |
| ... | ... | ... | ... |

131  132  133  134

MACHINE LEARNING DATA MANAGEMENT SYSTEM AND DATA MANAGEMENT METHOD

CROSS-REFERENCE TO RELATED APPLICATION

The present application claims priority from Japanese application JP2019-192920, filed on Oct. 23, 2019, the contents of which is hereby incorporated by reference into this application.

BACKGROUND OF THE INVENTION

1. Field of the Invention

The present invention is related to a machine learning data management technology.

2. Description of the Related Art

In artificial intelligence (AI) technology, a computer is trained to perform various difficult tasks in business or life by collecting various kinds of data and causing patterns to be recognized using machine learning or deep learning.

For example, various kinds of data are data from various kinds of sensors, and an analysis application such as machine learning or deep learning analyzes various kinds of data. To this end, a data management system stores various kinds of data, a learning data set which enters a useful state by performing filtering or the like to select only necessary information from various kinds of data, and a learning model obtained by analyzing the learning data set through an AI application.

However, various kinds of data, the learning data set, and the learning models are lost from the data management system as they are updated on the data management system over time if necessary. As described above, since necessary data is not stored on the data management system, relearning of a learning model or evidence search is unable to be performed later.

In general, a technique for storing data at a certain time point and multiple generations of backup images is disclosed in U.S. Pat. No. 9,405,756.

According to U.S. Pat. No. 9,405,756 described above, it is possible to store multiple generations of backup images and restore original data from the backup images, but coordination with an AI analysis application such as machine learning or deep learning is not considered. In other words, it is not considered to store various kinds of data or the like when the learning model is generated. Therefore, in a case in which an AI application user desires to refer to past data for the purpose of relearning of a learning model, evidence search, or the like, data at the same time point is not stored, and thus it is unable to be referred to.

SUMMARY OF THE INVENTION

It is an object of the present invention to provide a data management system and a data management method which are capable of enabling an AI application user to refer to past data for the purpose of relearning of a learned data model, evidence search, or the like.

In order to achieve the above object, an aspect of a data management system of the present invention includes a data analysis server that generates curated data from raw data of various kinds of data, learns the curated data, and generates a learned data model, a data storage including a first storage area that stores the learned data model, a second storage area that stores the curated data, and a third storage area that stores the raw data, and a storage management server that manages the data storage. The data analysis server manages first data configuration information for managing a correspondence of the learned data model, a raw data bucket that stores the raw data for generating the learned data model, and a curated data bucket that stores the curated data for generating the learned data model and second data configuration information for managing correspondences of the learned data model and the first storage area, the curated data bucket and the second storage area, and the raw data bucket and the third storage area, and gives an instruction to acquire snapshots of the second storage area that stores the curated data for generating the learned data model and the third storage area that stores the raw data for generating the learned data model to the data storage via the storage management server when the learned data model is generated.

According to the present invention, the AI application users can realize relearning of a learned data model, evidence search, or the like with reference to past data.

BRIEF DESCRIPTION OF THE DRAWINGS

FIG. 7 is a diagram illustrating an example of storage configuration management information according to an embodiment;

FIG. 8 is a diagram illustrating an example of snapshot management information according to an embodiment;

FIG. 9 is a diagram illustrating an example of data configuration information (from a curated data bucket to a learned data model) according to an embodiment;

FIG. 10 is a diagram illustrating an example of data configuration information (from a raw data bucket to a curated data bucket) according to an embodiment;

FIG. 11 is a diagram illustrating an example of data configuration information (from a data source to a raw data bucket) according to an embodiment;

FIG. 12 is a diagram illustrating an example of data configuration information (data bucket storage configuration information) according to an embodiment;

FIG. 13 is a diagram illustrating an example of data configuration information (a consistent snapshot group) according to an embodiment;

FIG. 20 is a diagram illustrating an example of a data configuration management GUI and a data relation diagram (chronological) according to an embodiment.

DETAILED DESCRIPTION OF THE PREFERRED EMBODIMENTS

Figure 1:
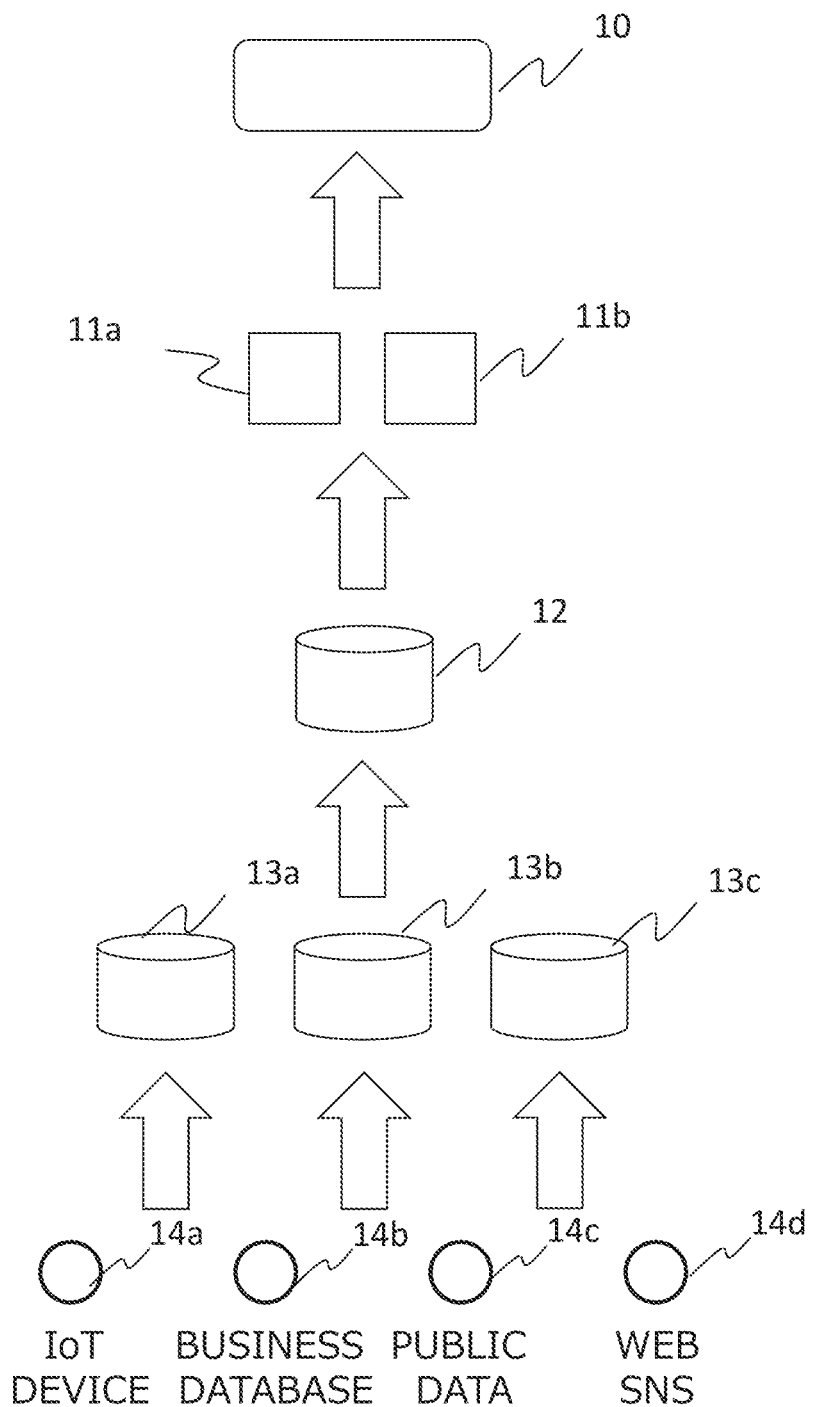
FIG. 1 is a diagram illustrating a data management concept according to an embodiment.

In the following description, an "interface unit" may be one or more interfaces. One or more interfaces may be the same type of one or more communication interface devices (for example, one or more network interface cards (NICs)) or may be different types of two or more communication interface devices (for example, NICs and host bus adapters (HBAs)).

Further, in the following description, a "memory unit" is one or more memories and may typically be a main storage device. At least one memory in the memory unit may be a volatile memory or may be a non-volatile memory.

Further, the data storage constitutes a logical device (LDEV) which is a logical storage area having a redundant configuration through at least one PDEV. Each LDEV has at least one logical unit (LU). In the following description, "PDEV" stands for a physical storage device which is a storage device, and is typically a non-volatile storage device, for example, a hard disk drive (HDD) or a solid state drive (SSD). Alternatively, it may be a flash package.

The redundant configuration may be a configuration including a plurality of node devices such as erasure coding, redundant array of independent nodes (RAIN), and inter-node mirroring or may be a configuration with a single computer such as one or more redundant array of independent (or inexpensive) disks (RAIDs) serving as at least a part of a PDEV unit.

In the following description, a "processor section" is one or more processors. At least one processor is typically a microprocessor such as a central processing unit (CPU) but may be other types of processors such as a graphics processing unit (GPU). At least one processor may be a single-core processor or may be a multi-core processor.

Further, at least one processor in the broad sense of the term may be a processor such as a hardware circuit (for example, a field-programmable gate array (FPGA) or an application specific integrated circuit (ASIC)) that performs some or all of processes.

In the following description, information such as "xxx table" may be used to describe information for which an output is obtained for an input, but the information may be data of a certain structure or may be a learning model such as neural network that generate an output in response to an input. Therefore, "xxx table" can be called "xxx information."

Also, in the following description, a configuration of each table is an example, and one table may be divided into two or more tables, or all or some of two or more tables may be one table.

Also, in the following description, there are cases in which a process is described using a "program" as a subject, but since a predetermined process is performed using a storage unit, an interface unit, and/or the like appropriately as the program is executed by a processing unit, the subject of the process may be a processor unit (or a device such as a controller including a processor unit).

The program may be installed in a device such as a computer and may be, for example, a (for example, non-transitory) recording medium which is readable by a program distribution server or a computer. In the following description, two or more programs may be realized as one program, or one program may be realized as two or more programs.

In the following description, a "computer system" is a system including one or more physical computers. The physical computer may be a general-purpose computer or a dedicated computer. The physical computer may function as a computer (for example, referred to as a host computer or a server system) that issues an input/output (IO) request or may function as a computer (for example, a storage device) that performs data I/O in response to the I/O request.

In other words, the computer system constitutes the data management system. The data management system includes one or more data transfer servers that issue an I/O request to store data, a data storage which is one or more storage devices that performs I/O of data in response to the I/O request, a storage management server that manages the data storage, a data analysis server that analyzes data stored in the data storage, and at least one client computers that use analysis results of the data analysis server.

One or more virtual computers (for example, virtual machines (VMs)) may be executed in a physical computer. The virtual computer may be a computer that issues an I/O request or a computer that performs data I/O in response to an I/O request.

Also, the computer system may be a distributed system configured with one or more (typically, multiple) physical node devices. The physical loading device is a physical computer.

Also, as a physical computer (for example, a node device) executes predetermined software, a software-defined anything (SDx) may be constructed in the physical computer or in a computer system including the physical computer. For example, a software defined storage (SDS) or a software-defined datacenter (SDDC) may be adopted as the SDx.

Further, in the following description, an identification number is used as identification information of various kinds of objects, but identification information of a type other than the identification number (for example, an identifier including an alphabet letter or a code) may be employed.

Further, in the following description, a reference numeral (or a common numeral among reference numerals) may be used in a case in which the description proceeds without distinguishing the same type of elements, and identification numbers (reference numerals) of elements may be used in a case in which the description proceeds while distinguishing the same type of elements.

First Embodiment

<Data Management Concept>

Hereinafter, exemplary embodiments will be described with reference to the appended drawings.

First, a data management concept according to an embodiment will be described.

FIG. 1 is a diagram illustrating a data management concept according to an embodiment.

An IoT device, a business database, public data, and a WEB or an SNS will be described as examples of a data source. Raw data from an IoT device 14a, raw data from a business database 14b, raw data from public data 14c, and raw data from a WEB or an SNS 14d are stored in at least one of raw data buckets 13a to 13c.

The raw data stored in the raw data bucket 13 is classified, combined, and stored in a curated data bucket 12 as curated data that is shared with a new value.

The data stored in the curated data bucket 12 is analyzed by an analysis application 10 such as machine learning or deep learning to obtain learned data models 11a and 11b.

Here, a correspondence between terms used in the present embodiment and general terms is as follows: a raw data bucket corresponds to a data lake storing data from a data source; a curated data bucket corresponds to a learning data set; and a learned data model corresponds to a learning model.

As described above, various kinds of data (raw data) from the data source are first stored in the raw data bucket 13 corresponding to the data lake and stored in the curated data bucket corresponding to the learning data set as curated data having a format which is easy to be analyzed. The data stored in the curated data bucket is analyzed by the analysis application such as the machine learning or the deep learning and provided to the user or the analysis application 10 as the learned data model corresponding to the learning model. The learned data model is usually managed by a file in a file system.

<Technical Problem>

Figure 2:
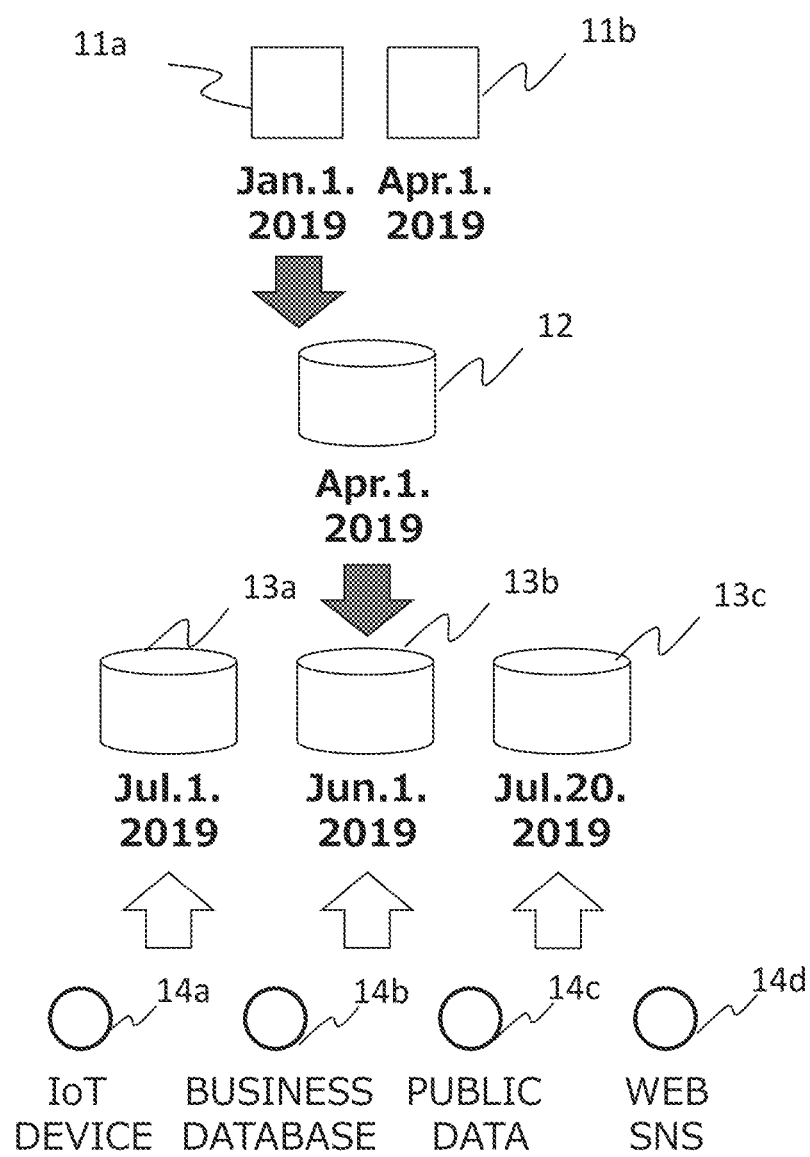
FIG. 2 is a diagram describing an example of a technical problem of the present invention.

FIG. 2 is a diagram describing an example of a technical problem of the present invention.

The raw data from the data source is consistently generated and thus updated if necessary. FIG. 2 illustrates that the raw data bucket 13a that stores the raw data from the IoT device 14a and the business database 14b was updated on Jul. 1, 2019, the raw data from the business database 14b and the public data 14c was updated on Jun. 1, 2019, and the raw data from the public data 14c and the SNS 14d was updated on Jul. 20, 2019.

On the other hand, the learned data model 11a is a learned data model of Jan. 1, 2019, and the learned data model 11b is a learned data model of Apr. 1, 2019.

The data curated on Apr. 1, 2019 is stored in the curated data bucket 12.

In such a situation, for the learned data model 11a of Jan. 1, 2019, when the AI application user desires to refer to past raw data, curated data, or the like for the purpose of relearning of a learned data model, evidence search or the like, there arises a problem in that it is unable to be referred to since data at the same time point is not stored. A similar problem arises for the learned data model 11b. Also, the curated data is also unable to be referred to because raw data at the same time is not already stored in the raw data bucket 13.

The data management system of the present embodiment provides a data management system capable of enabling the AI application user to refer to necessary curated data or raw data when relearning of a learned data model, evidence search, or reverification is performed on the learned data model.

<System Configuration>

Figure 3:
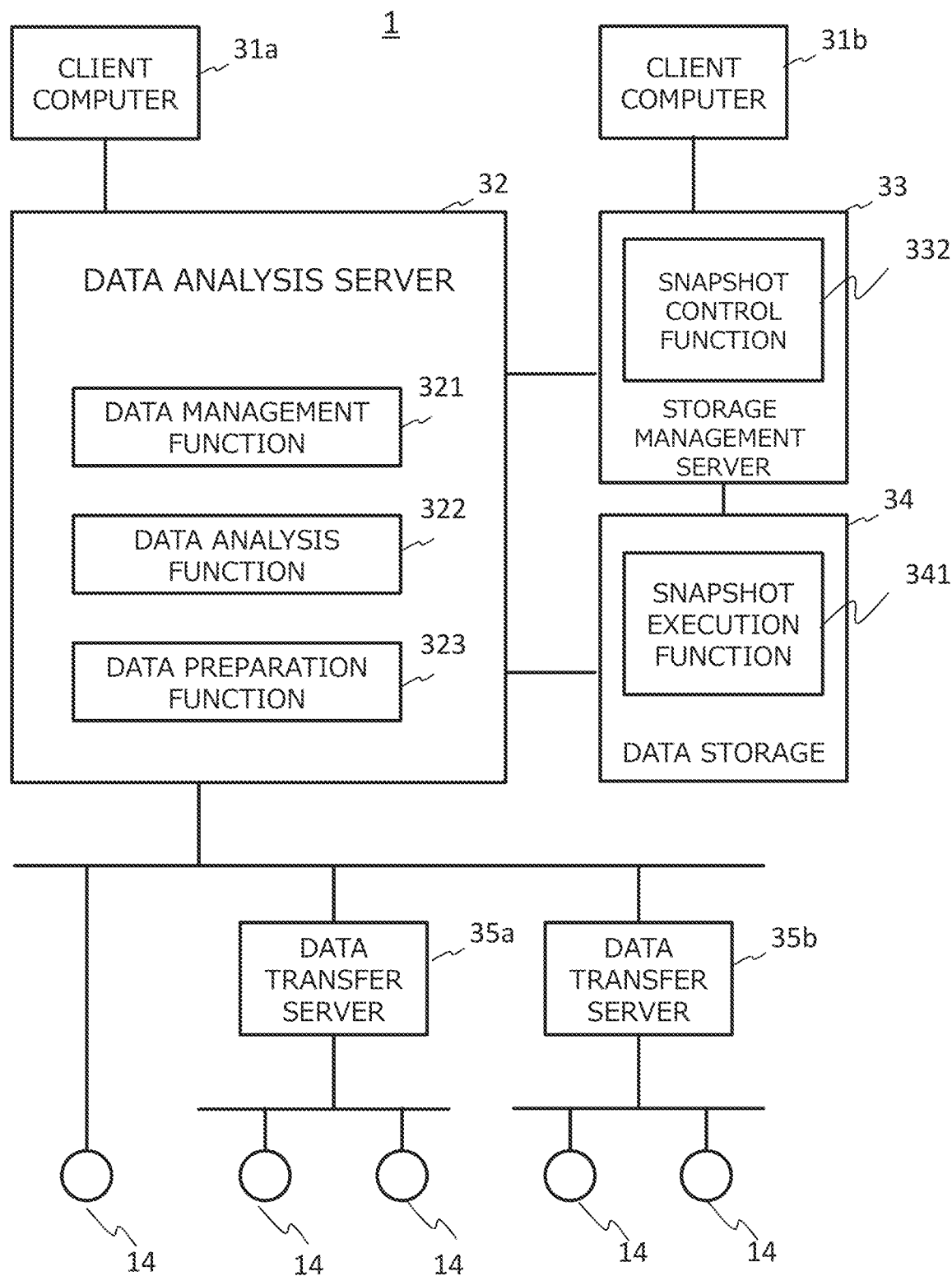
FIG. 3 is a diagram illustrating an example of a system configuration of a data management system according to an embodiment.

FIG. 3 illustrates an example of a configuration diagram of the data management system according to an embodiment.

A data management system 1 includes a data source 14 such as an IoT device, a business database, public data, and a WEB or an SNS, a data storage 34 that stores data (raw data) from the data source 14, and one or more data transfer servers 35 that transfer data from the data source 14 to the data storage. In a case in which the data source 14 directly transfers data to the data storage 34, the data transfer server 35 need not be unnecessarily provided.

The data storage 34 provides a LU corresponding to the raw data bucket 13 illustrated in FIG. 1, a LU corresponding to the curated data bucket 12, and a LU storing the learned data model 11. Note that a LU is configured with a logical device (LDEV) which is a logical storage area having a redundant function as described above. Each LDEV is configured with a PDEV configured with a hard disk drive (HDD) or a solid state drive (SSD).

The data management system 1 includes a data analysis server 32, a storage management server 33, a data storage 34, and a data transfer server 35.

The data storage 34 includes a plurality of PDEVs (or one PDEV) which are physical storage devices and a storage controller connected to the PDEV.

The storage controller includes an I/F, a memory, and a processor connected to them. The I/F is a communication interface device that mediates data exchange data between other computer systems and the storage controller.

The data transfer server 35 transmits an I/O request (a write request or a read request) designating an I/O destination (for example, a logical volume number such as a logical unit number (LUN) or a logical address such as a logical block address (LBA)) to the storage controller. Even in a case in which the data source 14 transfers the raw data to the data storage 34, the I/O request designating the LUN or the LBA is similarly transmitted.

The memory of the data storage 34 stores a program executed by the processor and data used by the processor. A snapshot program for acquiring a snapshot is stored in the memory and executed by the processor to realize a snapshot execution function 342.

The storage management server 33 manages the data storage 34. The storage management server 33 controls acquisition of a snapshot of data stored in the data storage in cooperation with the data analysis server 32. The storage management server 33 includes a common computer system configuration. In other words, the storage management server 33 includes a processor and a memory, and executes, for example, a snapshot control program that controls a timing to acquire the snapshot stored in the memory to realize a snapshot control function 332.

The data analysis server 32 generates curated data from the raw data of various kinds of data, and generates a learned data model by learning the curated data. The learned data model may be provided to a client computer 31. The data analysis server 32 includes a data management function 321, a data analysis function 322, and a data preparation function 323. The learned data model is transferred to and stored in the data storage 34. The data analysis server will be described in detail later.

<Software Configuration>

Figure 4:
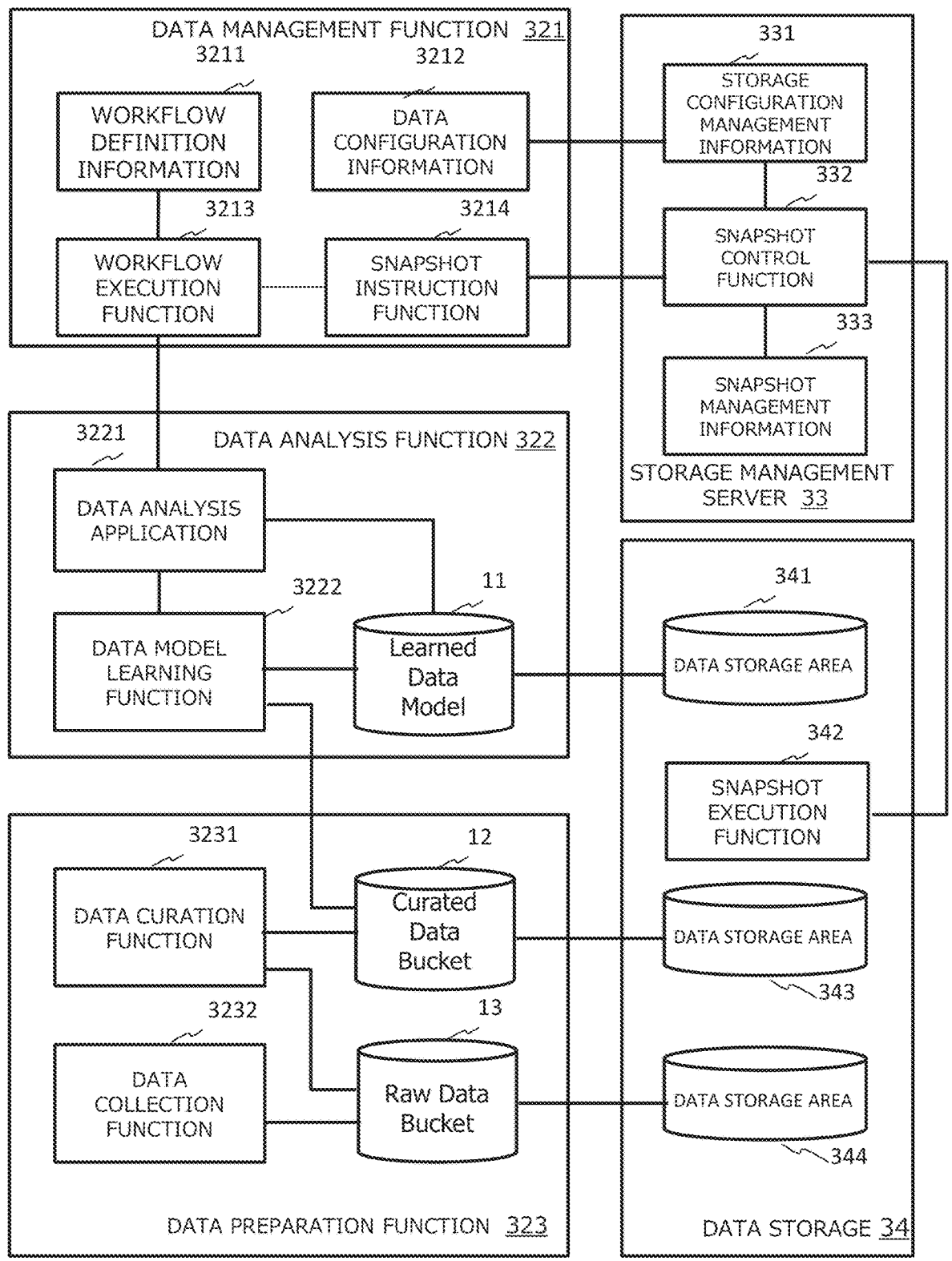
FIG. 4 is a diagram illustrating an example of a software configuration of a data management system according to an embodiment.

FIG. 4 is a diagram illustrating an example of a software configuration of the data management system according to an embodiment.

FIG. 4 illustrates functions of the data analysis server 32, the storage management server 33, and the data storage 34.

The data storage 34 includes a data storage area 341 which stores the learned data model, a data storage area 343 which corresponds to the curated data bucket and stores the curated data, and a data storage area 344 which corresponds to the raw data bucket and stores the raw data. Each data storage area corresponds to a LU. Further, the data storage 34 includes a snapshot execution function 342 that acquires a snapshot of an LDEV including a LU which is each data area. Since the snapshot technology is already widely used, detailed description thereof is omitted.

The storage management server 33 manages the data storage 34 and controls acquisition of the snapshot of the data stored in the data storage in cooperation with the data analysis server 32. The storage management server 33 stores storage configuration management information 331 for managing a relation between the LU and the LDEV in the storage device. Further, the storage management server 33 includes a snapshot control function 332 for controlling a timing to acquire the snapshot. The storage management server 33 stores snapshot management information 333 for managing the snapshot acquired by the snapshot control function 332 in the storage device.

The data analysis server 32 is a common computer system including a memory, a processor serving as a processing unit, and a display device. The data analysis server 32 includes the data management function 321, the data analysis function 322, and the data preparation function 323. The respective functions are realized by executing a data management program, a data analysis program, and a data preparation program stored in the memory through the processor.

Figure 14:
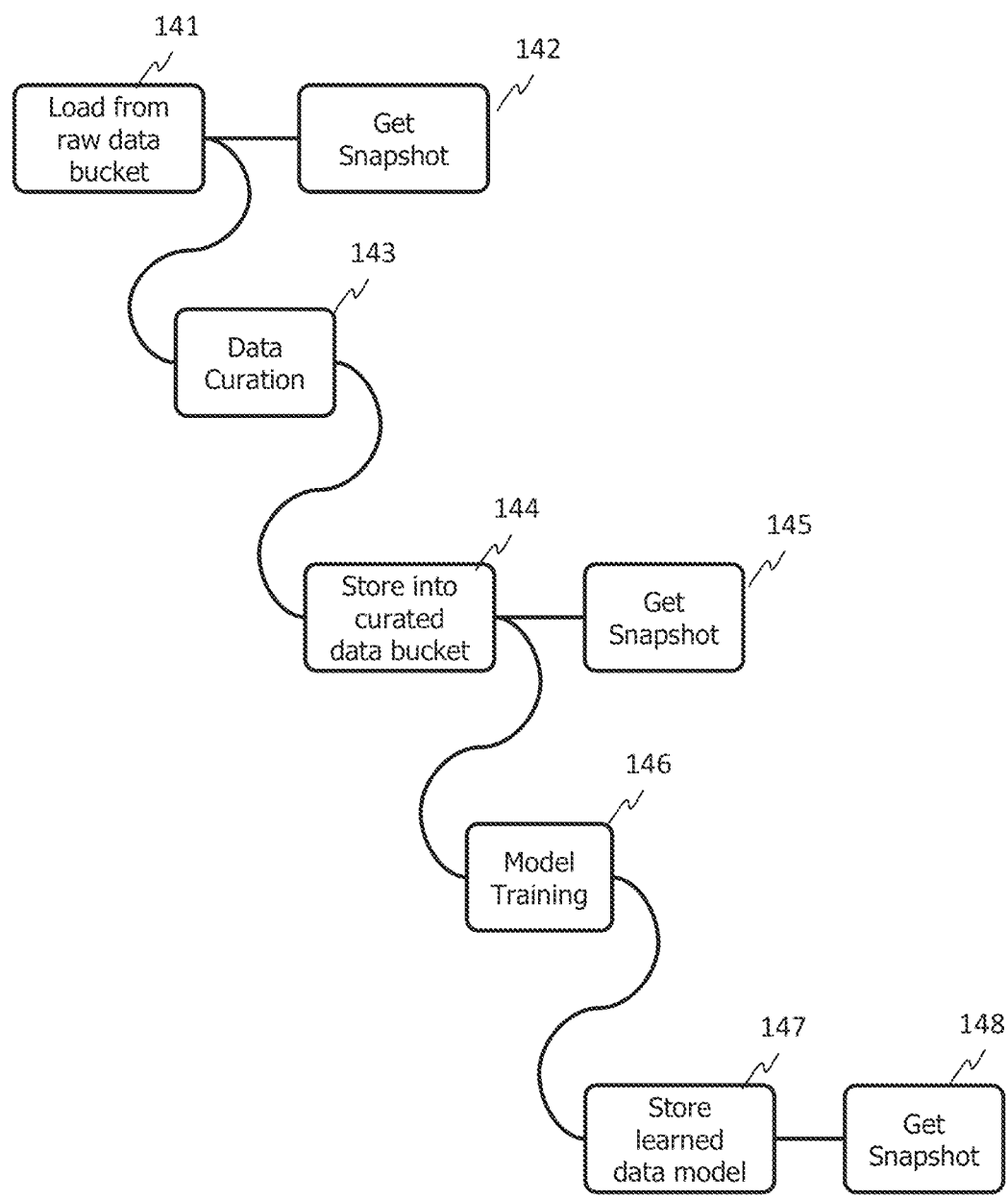
FIG. 14 is a diagram illustrating an example of workflow definition information (a data preparation process) according to an embodiment.
Figure 15:
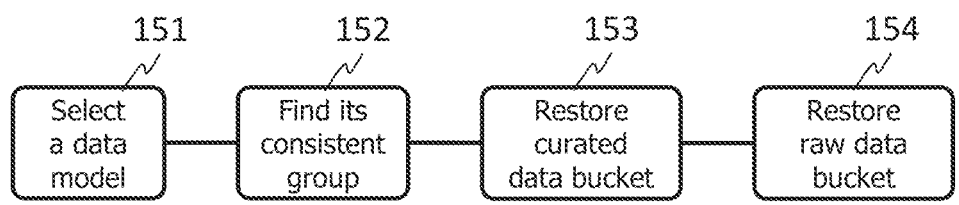
FIG. 15 is a diagram illustrating an example of workflow definition information (a data restoration process) according to an embodiment.

The data management function 321 includes workflow definition information 3211 illustrated in FIGS. 14 and 15 and data configuration information 3212 illustrated in FIGS. 9 to 12, and includes a snapshot instruction function for giving a snapshot acquisition instruction to the snapshot control function 332 of the storage management server 33, and a workflow execution function 3213 for executing the workflow defined in the workflow definition information 3211.

The data preparation function 323 includes the raw data bucket 13 that corresponds to the data storage area 344 of the data storage 34 and stores the raw data, a data collection function 3232 that collects data from the data source 14 and stores the collected data in the raw data bucket 13, and a data curation function 3231 that curates the data stored in the raw data bucket 13 and stores the curated data in the curated data bucket 12. Note that the curated data bucket 12 corresponds to a data storage area 343 of the data storage 34.

The data analysis function 322 includes a data model learning function 3222 that performs learning on the curated data stored in the curated data bucket of the data preparation function 323 by machine learning, deep learning, or the like, the learned data model 11 that stores the learned data model by the data model learning function 3222, and a data analysis application that analyzes data using the learned data model stored in the learned data model 11. The learned data model 11 is stored in the data storage area 341 of the data storage 34 as a file.

As described above, each of the data storage area 341, the data storage area 343, and the data storage area 344 of the data storage 34 corresponds to the LU provided by the storage controller of the data storage 34.

The data preparation function 323 receives various kinds of data from the data source 14 and stores them in the raw data bucket 13. Various kinds of data stored in the raw data bucket 13 are stored in the curated data bucket 12 as the curated data in a state which it is curated by the data curation function 3231 so that it is easily analyzed.

For the curated data stored in the curated data bucket 12, the learned data model is generated and stored by the data model learning function 3222.

As described above, the data analysis server 32 generates and manages data of each layer such as the raw data, the curated data, and the learned data model as illustrated in FIG. 1 by the data preparation function 323 and the data analysis function 322. The data of each layer such as the raw data, the curated data, and the learned data model is stored in the corresponding LU of the data storage 34.

<Data Relation Diagram>

Figure 5:
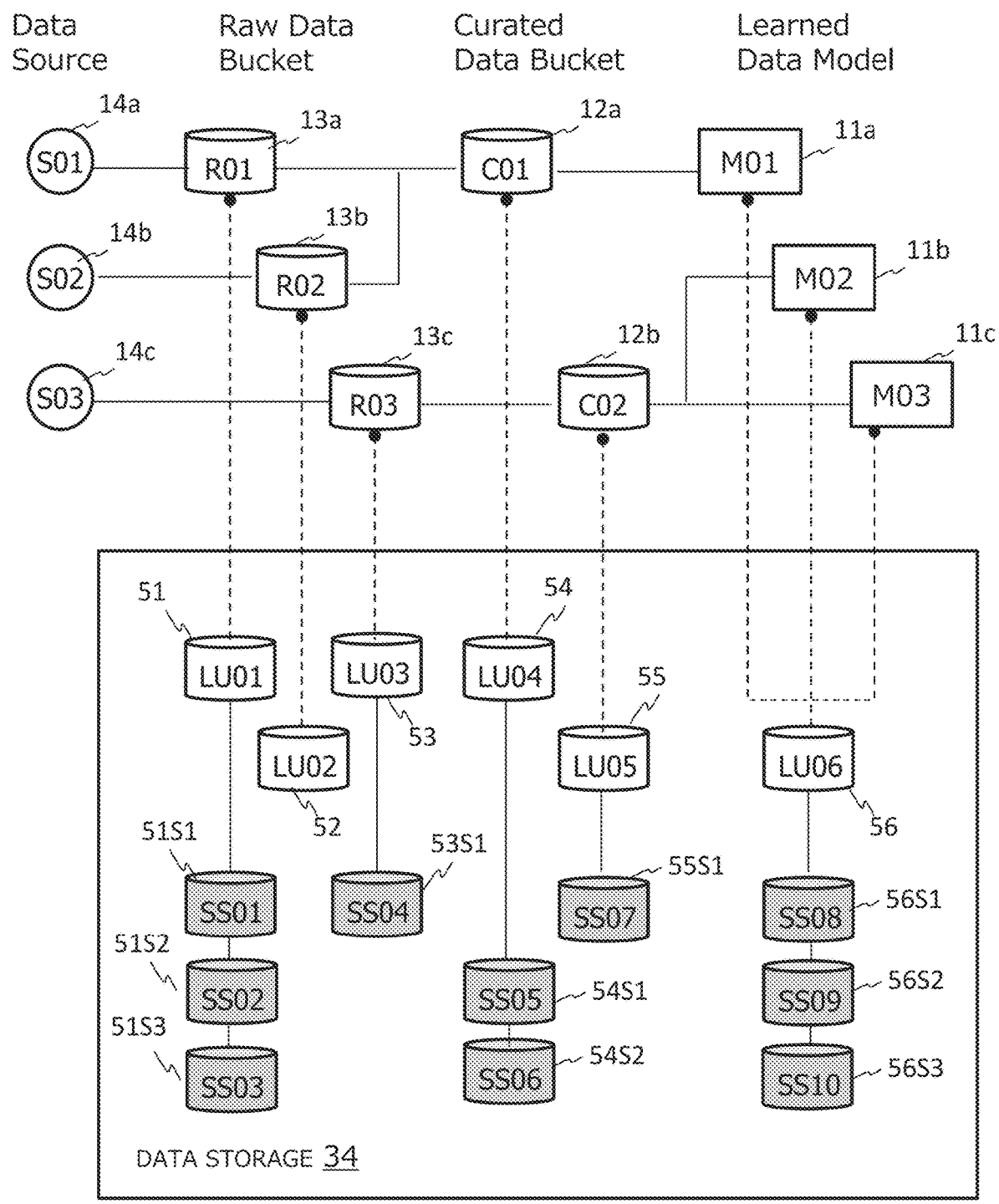
FIG. 5 is a diagram illustrating an example of a data relation diagram (configuration diagram) according to an embodiment.

FIG. 5 is a diagram illustrating an example of a data relation diagram (configuration diagram) according to an embodiment.

A data relation diagram (configuration diagram) is also referred to as a data configuration relation. The data configuration relation is managed as data configuration information 3212 of the data management function 321. FIG. 5 illustrates a correspondence relation of each layer such as the raw data bucket 13, the curated data bucket 12, and the learned data model 11 of the data analysis server 32 of FIG. 4 and each LU of the data storage 34 and further illustrates a relation of each LU and a snapshot.

For example, on the data analysis server, raw data of a data source S01 (14a) is stored in a raw data bucket R01 (13a), and raw data of a data source S02 (14b) is stored in a raw data bucket R02 (13b). On the data analysis server, curated data is generated from the raw data stored in the raw data bucket R01 (13a) and the raw data bucket R02 (13b) by the data curation function 3231 and stored in a curated data bucket C01 (12a). Further, on the data analysis server, the data model learning function 3222 learns the curated data stored in the curated data bucket C01 (12a), and generates a learned data model M01 (11a).

Similarly, for a data source S03 (14c), it is stored in a raw data bucket R03 (13c), curated data is stored in a curated data bucket C02 (12b), and a learned data model M02 (11b) and a learned data model M03 (11c) are generated.

On the data analysis server, the raw data bucket 13 storing the raw data from the data source, the curated data bucket 12 storing the curated data obtained by curating the data stored in the raw data bucket, and the learned data model obtained by learning the curated data stored in curated data bucket 12 by data model learning function are managed in association with one another, and thus it is possible to manage the correspondence relation of the data at the same time point when the AI application user desires to refer to the past data for the purpose of relearning of a learned data model, evidence search, or the like.

On the other hand, in the data storage 34, a plurality of LUs are provided by the storage controller. For example, the raw data of different data sources 14 is stored in a corresponding LU such that LU01 (51) corresponds to the raw data bucket R01 (13a), LU02 (52) corresponds to the raw data bucket R02 (13b), and LU03 (53) corresponds to the raw data bucket R03 (13c).

Also, on the data analysis server 32, the curated data bucket C01 (12a) corresponds to LU04, and the curated data bucket C02 (12b) corresponds to LU05. Further, the learned data model M01 (11a), the learned data model M02 (11b), and the learned data model M03 (11c) on the data analysis server 32 are stored in LU06 (56).

LU01 (51) acquires three snapshots of different time points, that is, a snapshot SS01 (51S1), a snapshot SS02 (51S2), and a snapshot SS03 (51S3) through the snapshot execution function 342.

Similarly, LU03 acquires one snapshot SS04 (53S1), and LU04 acquires two snapshots, that is, a snapshot SS05 (54S1) and a snapshot SS06 (54S2). LU05 and LU06 also acquire snapshots as illustrated in FIG. 5.

In the present embodiment, the data of each layer such as the raw data bucket 13, the curated data bucket 12, and the learned data model 11 on the data analysis server is managed in association with each LU of the data storage 34, and the relation with the snapshots of the respective LUs of the data storage 34 acquired at different times is managed as in the data relation diagram illustrated in FIG. 5, and thus the AI application user can easily manage and refer to the past data for the purpose of relearning of a learned data model, evidence search, or the like.

Figure 6:
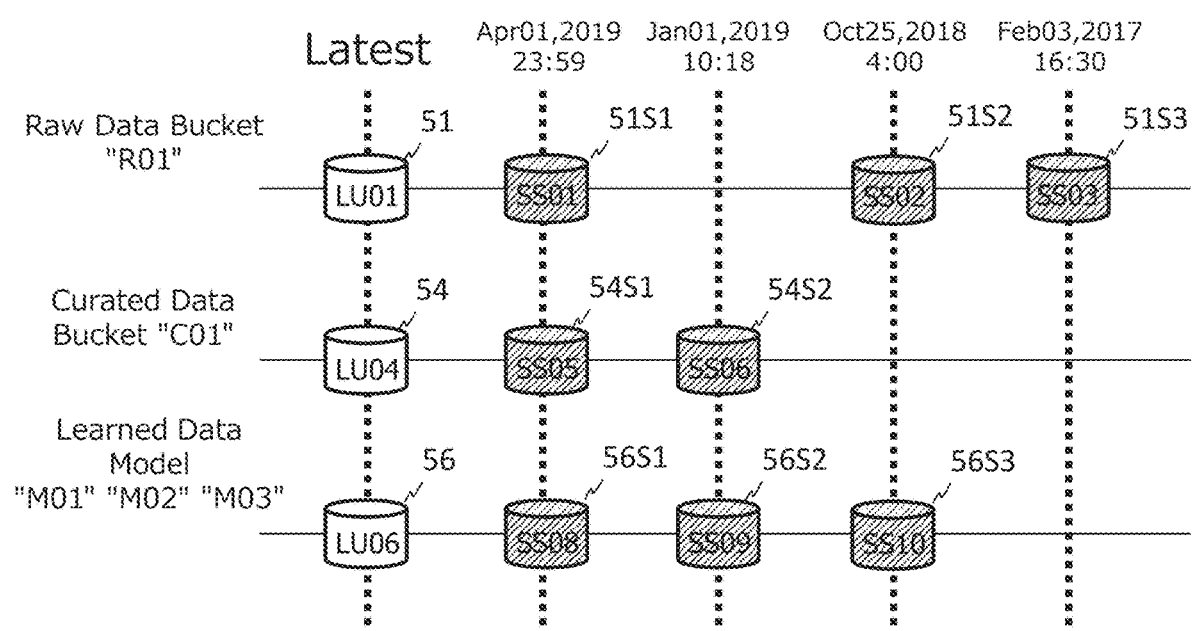
FIG. 6 is a diagram illustrating an example of a data relation diagram (chronological) according to an embodiment.

FIG. 6 is a diagram illustrating an example of a data relation diagram (chronological) according to an embodiment.

The data relation diagram (chronological) is also referred to as a data chronological relation. The data chronological relation is managed as the data configuration information 3212 of the data management function 321.

The data relation diagram (chronological) of FIG. 6 illustrates a relation of the data source S01 in the data relation diagram (configuration diagram) of FIG. 5, the latest states of LU01 (51), LU04 (54), and LU06 (56) that stores the raw data bucket R01, the curated data bucket C01, and the learned data model M01, and the snapshot acquisition time of each LU. The data chronological relation indicates a relation of the raw data bucket, the curated data bucket, and the learned data model, a relation of the raw data bucket and a first storage area (LU), the curated data bucket and a second storage area (LU), and the learned data model and a third storage area (LU), and a relation with the snapshot acquisition times of the first storage area, the second storage area, and the third storage area.

Note that, LU06 is a LU that stores the learned data model M02 and the learned data model M03 in a file format in addition to the learned data model M01.

LU01 corresponding to the raw data bucket R01 acquires three snapshots, that is, the snapshot SS01 acquired at 23:59 on Apr. 1, 2019, the snapshot SS02 acquired at 4:00 on Oct. 25, 2018, and the snapshot SS03 acquired at 16:30 on Feb. 3, 2017.

For LU04 corresponding to the curated data bucket C01 acquires a snapshot SS05 acquired at 23:59 on Apr. 1, 2019 and a snapshot SS06 acquired at 10:18 on Jan. 1, 2019.

LU06 that stores the learned data model M01 acquires three snapshots, that is, a snapshot SS08 acquired at 23:59 on Apr. 1, 2019, a snapshot SS09 acquired at 10:18 on Jan. 1, 2019, and a snapshot SS10 acquired at 4:00 on Oct. 25, 2018.

According to the relation diagram illustrated in FIG. 6, the snapshots of the raw data bucket R01, the curated data bucket C01, and the learned data model M01 are acquired at 23:59 on Apr. 1, 2019, and the AI application user can refer to the past raw data which is the basis of the curated data which is original data for generating the learned data model M01 for the purpose of relearning of the learned data model M01, evidence search, or the like.

As data at 10:18 on Jan. 1, 2019, there are a snapshot SS06 of the curated data bucket C01 and a snapshot SS09 of the learned data model M01, and there is no snapshot of the raw data bucket, and thus for relearning or the like of the learned data model M01, only analysis based on the curated data is able to be performed, analysis based on the raw data is unable to be performed.

On the other hand, as data at 4:00 on Oct. 25, 2018, there are a snapshot SS02 of raw data bucket R01 and a snapshot SS10 of the learned data model M01, and there is no snapshot of the curated data bucket, and thus for relearning or the like of the learned data model M01, only analysis based on the raw data is able to be performed, and curation of the raw data is necessary for analysis based on the curated data.

In order to perform high-accuracy reanalysis on the learned data model M01, it is desirable to store both data of the raw data bucket R01 and data of the curated data bucket C01 in addition to the learned data model M01 of a time at which it is desired to perform analysis.

For example, in a case in which the application side determines that a recorded image by a specific camera has a value, it is desirable that even the raw data of a time point at which the learned data model M01 is generated can be analyzed.

<Management Information>

Next, the management information is described.

FIG. 7 illustrates contents of the storage configuration management information 331 of the storage management server 33.

The storage configuration management information 331 is managed such that an LDEV 73 which is an identifier of an LDEV corresponding to the target ID and a LUN 72 which is identification information of a LU included in the LDEV are associated with a target ID 71 specifying the storage area of the data storage 34.

For example, the target ID 71 "192.168.1.2" indicates that the LUN 72 is "LU06," and the LDEV 73 is "DEV01."

FIG. 8 is a diagram illustrating an example of the snapshot management information according to an embodiment. FIG. 8 illustrates content of the snapshot management information 333 of the storage management server 33. The snapshot management information 333 is managed such that a snapshot 82 which is an identifier of the snapshot and a snapshot acquisition time 83 are associated with an LDEV 81 which is an identifier of the LDEV.

For example, the LDEV 81 "DEV01" indicates that the snapshot identified by the snapshot identifier "SS08" is acquired at the snapshot acquisition time 83 "Apr. 1, 2019."

The storage configuration management information 331 and the snapshot management information 333 are transmitted from the storage management server 33 to the data management function 321 of the data analysis server 32 and become part of the data configuration information. Accordingly, the correspondence between each LU and the snapshot is managed, and the data management function 321 can configure, for example, the data relation diagram (configuration diagram) illustrated in FIG. 5. Further, since the acquisition time of each snapshot can also be managed, the data management function 321 can configure, for example, the data relation diagram (chronological) illustrated in FIG. 6.

<Data Configuration Information>

FIG. 9 is a diagram illustrating an example of the data configuration information (from the curated data bucket to the learned data model) according to an embodiment.

The data configuration information (from the curated data bucket to the learned data model) illustrated in FIG. 9 is managed by the data management function 321 of the data analysis server 32.

The data configuration information (from the curated data bucket to the learned data model) is information for managing a correspondence of the learned data model 11 from the curated data bucket 12 in the data management concept illustrated in FIG. 1. The data configuration information (from the curated data bucket to the learned data model) manages a correspondence of a learned data model 91 which is an identifier of the learned data model, a data store 92 which is a storage location for referring to the learned data model M01 or the like, a curated data bucket 93 identifying the curated data bucket, and time information 94 indicating a generation time of the learned data model.

For example, it is indicated that the learned data model 91 "M01" is data which is stored in "/mnt/str01" and generated from the curated data bucket "C01" at "Apr. 1, 2019." Since the learned data model is a file, the storage location is indicated by the file system.

FIG. 10 is a diagram illustrating an example of the data configuration information (from the raw data bucket to the curated data bucket) in the embodiment. The data configuration information (from the raw data bucket to the curated data bucket) illustrated in FIG. 10 is managed by the data management function 321 of the data analysis server 32.

The data configuration information (from the raw data bucket to the curated data bucket) according to an embodiment is information for managing a correspondence between the raw data bucket 13 and the curated data bucket 12 of FIG. 1. The data configuration information (from the raw data bucket to the curated data bucket) manages a correspondence between an identifier 101 of the curated data and an identifier 102 of the raw data bucket.

For example, "C01" which is the identifier 101 of the curated data is managed in associated with the identifier 102 "R01, R02" of the raw data bucket.

The data configuration information illustrated in FIGS. 9 and 10 is first data configuration information for managing the correspondence of the learned data model, the raw data bucket that stores the raw data for generating the learned data model, and the curated data bucket that stores the curated data for generating the learned data model.

FIG. 11 is a diagram illustrating an example of data configuration information (from the data source to the raw data bucket) according to an embodiment. The data configuration information (from the data source to the raw data bucket) illustrated in FIG. 11 is managed by the data management function 321 of the data analysis server 32.

The data configuration information (from the data source to the raw data bucket) according to an embodiment is information for managing a correspondence between the data source 14 and the raw data bucket 13 in FIG. 1. The data configuration information (from the data source to the raw data bucket) manages the correspondence of an identifier 111 of the raw data bucket and an identifier 112 of the data source.

For example, "R01" which is the identifier 111 of the raw data bucket is managed in association with to the identifier 112 "S01" of the data source.

FIG. 12 is a diagram illustrating an example of the data configuration information (data bucket storage configuration information) according to an embodiment. The data configuration information (data bucket storage configuration information) illustrated in FIG. 12 is managed by the data management function 321 of the data analysis server 32.

The data configuration information (data bucket storage configuration information) according to an embodiment indicates a relation of the learned data model 11, the curated data bucket 12, and the raw data bucket 13 on the data analysis server 32 illustrated in FIG. 5 and the LU on the data storage 34 corresponding to the learned data model 11, the curated data bucket 12, and the raw data bucket 13.

For example, it is indicated that a data store 121 "/mnt/str01" is associated with a device 122 "/dev/sda01" specifying the data storage, a target ID 123 "192.168.1.2" of the data storage, and a LUN 124 "LU06." Also, it is indicated that the data store 121 "C01" is associated with the device 122 "/dev/sdc01" specifying the data storage, the target ID 123 "192.168.1.3" of the data storage, and the LUN 124 "LU04."

The correspondences of the learned data model and LU06, the curated data bucket C01 and LU04, and the raw data bucket R01 and LU01 are managed.

As described above, which LU of which data storage is associated with the learned data model 11, the curated data bucket 12, and the raw data bucket 13 identified by the data analysis server 32 is managed as second data configuration information. Accordingly, the data relation diagram (configuration diagram) as illustrated in FIG. 5 can be understood. Also, by acquiring the snapshot of the corresponding LU of the data storage 34, it is possible to acquire the snapshot of information of each layer such as the learned data model 11, the curated data bucket 12, the raw data bucket 13 on the data analysis server, and it is possible to understand the relation of each LU and the snapshot through the data relation diagram (configuration diagram) illustrated in FIG. 5.

The data management system in the present embodiment associates each layer such as the learned data model 11, the curated data bucket 12, and the raw data bucket 13 managed by the data analysis server 32 with the LU managed by the data storage, and thus the AI application user using the data analysis server can perform relearning of the learned data model, evidence search, or the like with reference to the past data using the snapshot function of the data storage.

FIG. 13 is a diagram illustrating an example of the data configuration information (consistent snapshot group) according to an embodiment. The data configuration information (consistent snapshot group) according to an embodiment manages a correspondence of an identifier of a group 131, data 132 included in the group, an acquisition date and time 133 of each piece of data, and a snapshot ID 134 specifying the snapshot.

The data configuration information (consistent snapshot group) of FIG. 13 is information described using the data relation diagram (chronological) of the embodiment of FIG. 6 as an example.

"G01" includes "M01," "C01," and "R01" (see FIG. 5) are included in the group 131 as the data 132, and "M01" is acquired on "Apr. 1, 2019" and stored in a snapshot ID "SS08." "C01" is acquired on "Apr. 1, 2019" and stored in a snapshot ID "SS05." "R01" is acquired on "Apr. 1, 2019" and stored in a snapshot ID "SS01." It is possible to easily determine whether or not there are a snapshot of a curated data bucket and a snapshot of a raw data bucket which are acquired at the same time for the learned data model with reference to the data configuration information (consistent snapshot group).

The data configuration information (consistent snapshot group) of FIG. 13 manages at least two of the snapshots of the learned data model, the curated data bucket, and the raw data bucket acquired at the same time on the basis of the data configuration information (the second data configuration information) illustrated in FIG. 12, the storage configuration management information illustrated in FIG. 7, and third data configuration information generated from the snapshot management information illustrated in FIG. 8.

As described above, since the snapshot acquisition time of each LU is managed, the LU and the snapshot acquisition time can be understood through the data relation diagram (chronological) as illustrated in FIG. 6.

<Workflow Definition Information>

FIG. 14 is a diagram illustrating an example of workflow definition information (data preparation process) in the embodiment.

The created workflow definition information becomes workflow definition information 3211 managed by the data management function 321 of the data analysis server 32.

In FIG. 14, first, in a workflow 141, the data curation function 3231 loads the raw data bucket 13.

Then, in a workflow 142, the snapshot of the raw data bucket is acquired. This process corresponds to, for example, an operation of acquiring the snapshot SS01 of LU01 corresponding to the raw data bucket R01 of FIG. 5. In FIG. 4, the snapshot execution function 342 corresponds to the operation of acquiring the snapshot of the data storage area 344.

Then, in a workflow 143, the data curation function 3231 curates the data of the raw data bucket.

In a workflow 144, the curated data is stored (updated) in the curated data bucket C01. In a workflow 145, the snapshot is acquired from the stored (updated) curated data bucket. This corresponds to the operation of acquiring the snapshot SS05 of LU04 corresponding to the curated data bucket C01 of FIG. 5 by the snapshot execution function 342 of the data storage 34.

Then, in a workflow 146, the data of the curated data bucket C01 is learned by the data model learning function 3222 to generate the learned data model.

In a workflow 147, the learned data model is stored. The learned data model is stored in the LU of the corresponding data storage. This process corresponds to the process of storing the learned data model M01 of FIG. 5 in LU06 of the data storage 34.

In a workflow 148, the snapshot of the learned data model stored in LU06 is acquired. Actually, this is achieved by acquiring the snapshot of the LDVE corresponding to LU06 by the snapshot execution function 342 of the data storage 34.

As illustrated in FIG. 14, in addition to the data flow of generating the learned data model from the raw data via the curated data, the workflow of acquiring the snapshot of each data is generated and stored as the workflow definition information 3211 at each of a timing at which the data curation function loads the data from the raw data bucket, at a timing at which the data curation function stores the curated data in the curated data bucket, and a timing at which the learned data model is stored in the corresponding LU.

When this workflow is executed, the workflow execution function 3213 of the data management function 321 gives an instruction to the data analysis function 322, the data preparation function 323, and the storage management server 33.

FIG. 15 is a diagram illustrating an example of the workflow definition information (data restoration process) according to an embodiment.

The created workflow definition information becomes the workflow definition information 3211 managed by the data management function 321 of the data analysis server 32.

First, in a workflow 151, the learned data model is selected.

Then, in a workflow 152, the data management function 321 searches for a consistent group with reference to the data configuration information (consistent snapshot group) of FIG. 13. In the example of FIG. 13, "G01" which is the group 131 in which there are snapshots of the learned data model, the curated data bucket, and the snapshot of the raw data bucket at the same time is discovered.

Then, in a workflow 153, the curated data bucket is restored with the snapshot ID 134 "SS05" of the curated data bucket 132 "C01." This process is performed by the snapshot execution function 342 of the data storage 34.

Then, in a workflow 154, the raw data bucket is restored with snapshot ID 134 "SS01" of the raw data bucket 132 "R01." This process is performed by the snapshot execution function 342 of the data storage 34.

<Snapshot Acquisition Process>

Figure 16:
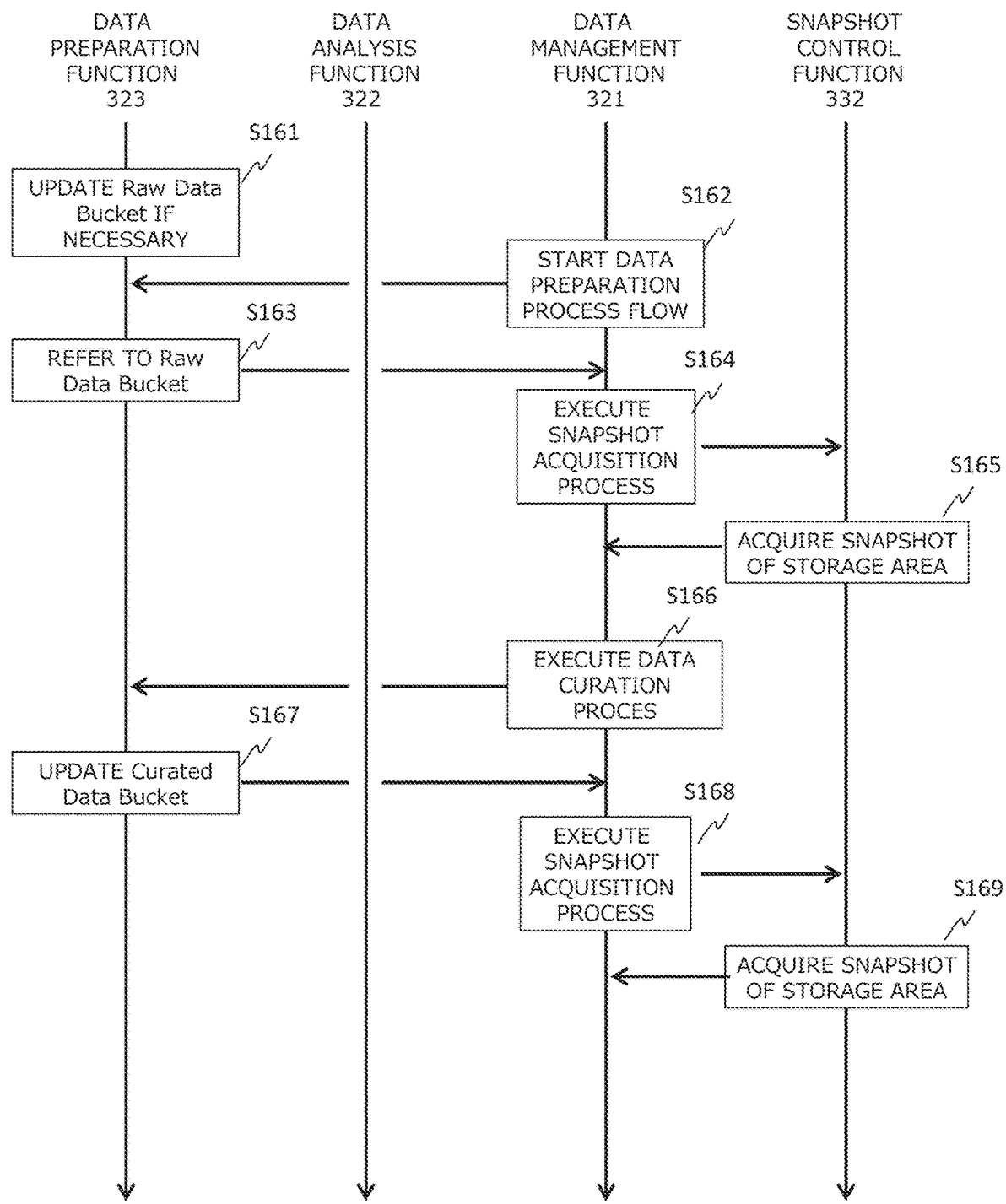
FIG. 16 is a diagram illustrating an example of a snapshot acquisition process flow according to an embodiment.

FIG. 16 is a diagram illustrating an example of a snapshot acquisition process flow according to an embodiment.

The data preparation function 323 receives various kinds of data from the data source and updates the raw data bucket if necessary (S161).

The data management function 321 gives an instruction to start the workflow illustrated in FIG. 14 to the data preparation function 323 (S162). Alternatively, an instruction to create the learned data model can be given.

Upon receiving the workflow start instruction, the data preparation function 323 refers to the raw data bucket (S163).

As the workflow is started, the snapshot instruction function 3214 of the data management function 321 instructs the snapshot control function 332 to execute the snapshot acquisition process with reference to the raw data bucket (S164).

The snapshot control function 332 causes the snapshot execution function 342 of the data storage 34 to execute the snapshot, acquires the snapshot of the storage area (LDEV) including the LU corresponding to the raw data bucket, and gives a notification to the data management function 321 (S165).

The data management function 321 instructs the data curation function 3231 of the data preparation function 323 to execute the data curation process (S166).

The data preparation function 323 which has received the instruction updates the curated data bucket and gives a notification to the data management function 321 (S167).

The data management function 321 which has received the notification instructs the snapshot control function 332 to execute the snapshot acquisition of the curated data bucket (S168).

The snapshot control function 332 causes the snapshot execution function 342 of the data storage 34 to execute the snapshot, acquires the snapshot of the storage area (LDEV) including the LU corresponding to the curated data bucket (S169).

As described above, when the raw data bucket for generating the learned data model is referred to in order to execute the workflow illustrated in FIG. 14, the snapshots of the raw data bucket and the curated data bucket are acquired at the time of the update of the curated data bucket from the raw data, and thus it is possible to store the corresponding raw data bucket and the corresponding curated data bucket when the learned data model is generated, and it is possible to refer to the raw data bucket and the curated data bucket when the learned data model is re-examined later.

Figure 17:
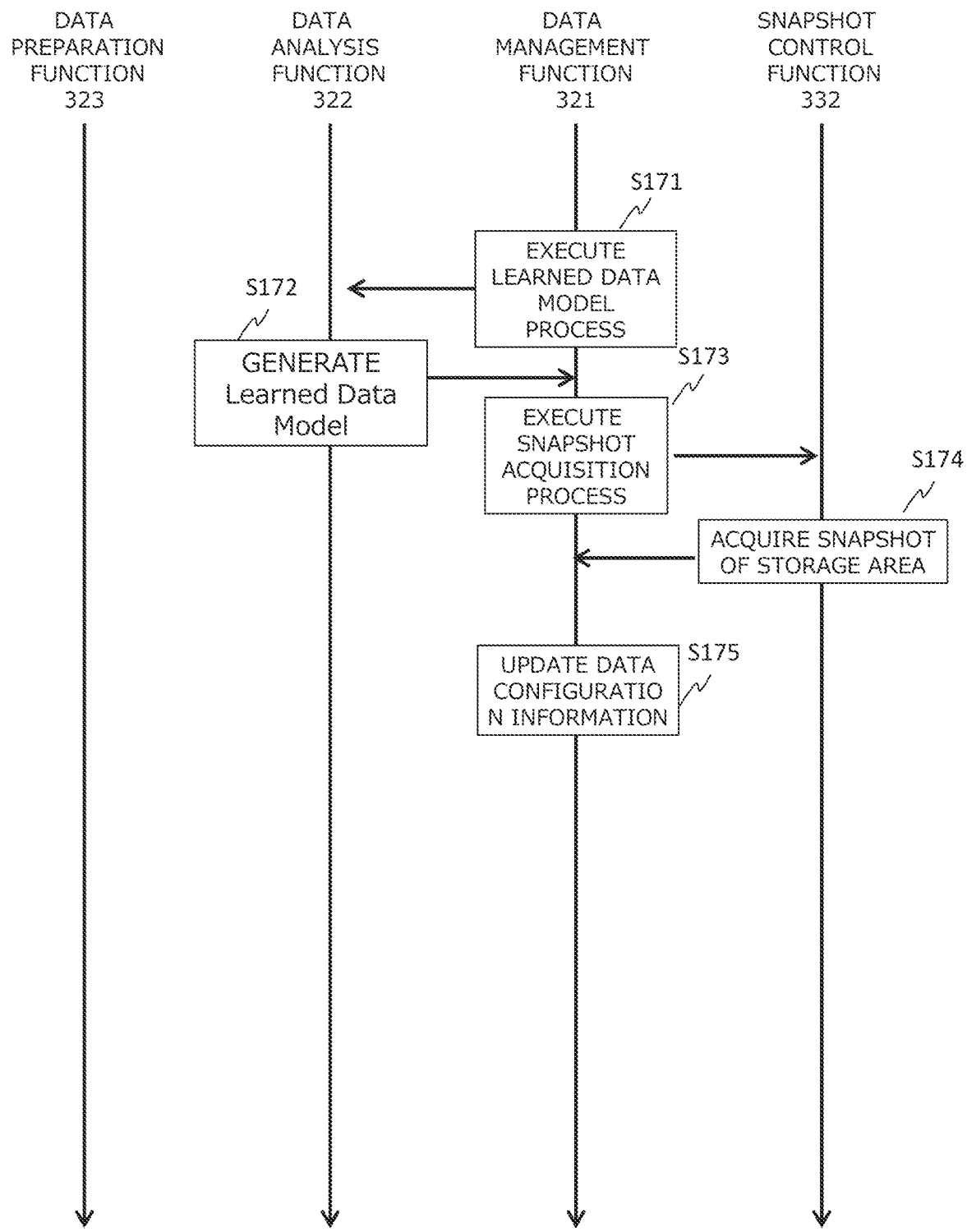
FIG. 17 is a diagram illustrating an example of a snapshot acquisition process flow according to an embodiment.

FIG. 17 is a diagram illustrating the snapshot acquisition process flow according to an embodiment.

The data management function 321 instructs the data analysis function 322 to execute the learned data model process (S171).

The data analysis function 322 generates the learned data model and gives a notification to the data management function 321 (S172).

Upon receiving the learned data model generation notification, the data management function 321 instructs the snapshot control function 332 to acquire the snapshot of the storage area (S173).

The snapshot control function 332 causes the snapshot execution function 342 of the data storage 34 to execute the snapshot and acquires the snapshot of the storage area (LDEV) including the LU that stores the learned data model (S174).

Upon receiving the snapshot acquisition notification of the learned data model from the snapshot control function 332, the data management function 321 updates the data configuration information (S175).

Figure 18:
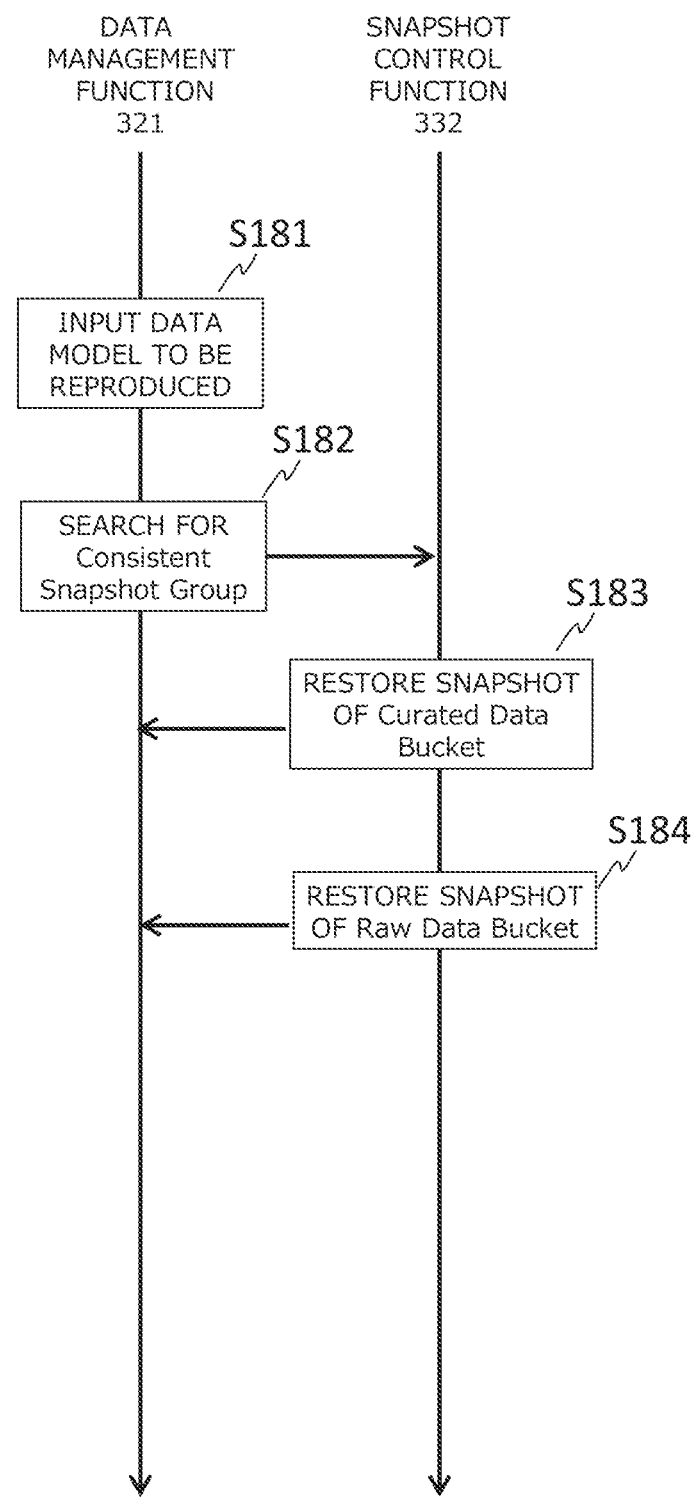
FIG. 18 is a diagram illustrating an example of a snapshot restoration process flow according to an embodiment.

FIG. 18 is a diagram illustrating an example of a snapshot restoration process flow in the embodiment.

The learned data model to be reproduced is input to the data management function 321 from the user (S181). The data management function 321 searches for the consistent group with reference to the data configuration information (consistent snapshot group) of FIG. 13 and gives a notification to the snapshot control function 332 (S182).

The snapshot control function 332 restores the snapshot of the curated data bucket and gives a notification to the data management function 321 (S183).

Thereafter, the snapshot control function 332 restores the snapshot of the raw data bucket and gives a notification to the data management function 321 (S184).

<Display Example>

Figure 19:
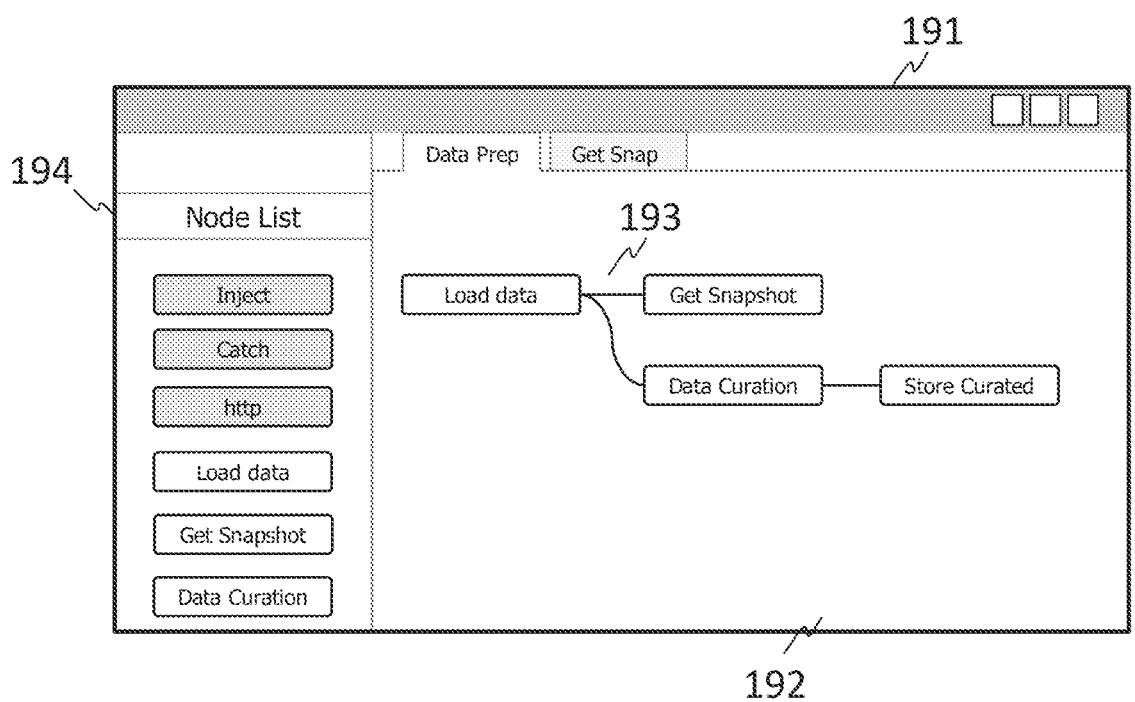
FIG. 19 is a diagram illustrating a GUI display example of a snapshot restoration process flow according to an embodiment.
Figure 2:
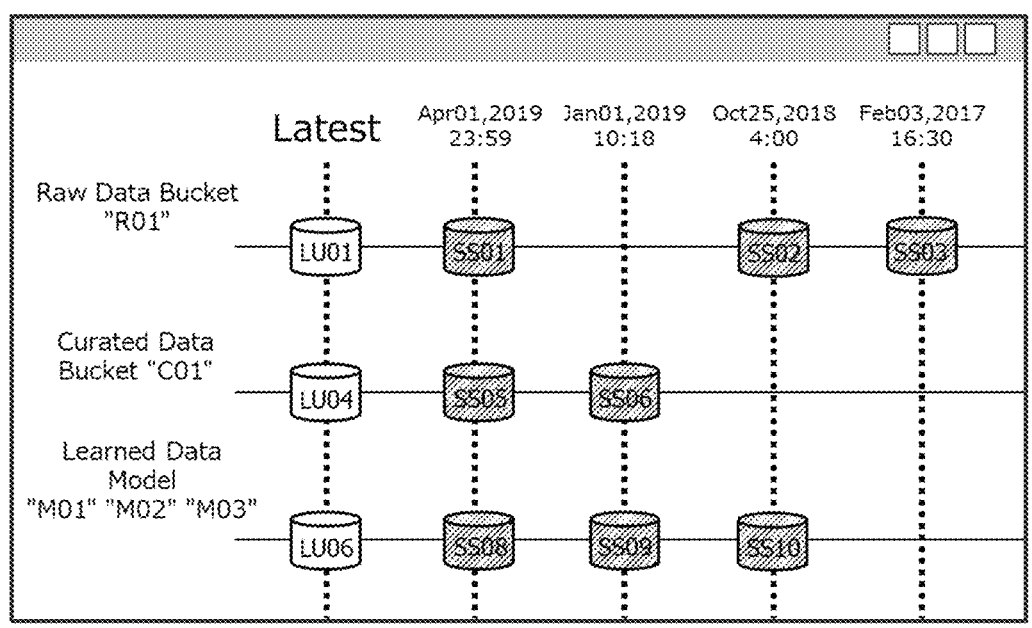

FIG. 19 is a diagram illustrating a GUI display example of the snapshot restoration process flow according to an embodiment.

The user selects a job from a node list part 194 and creates a snapshot restoration process flow 193 by dragging and dropping the workflow (snapshot restoration process flow) to a workflow display area 192.

In FIG. 19, a process flow of first selecting a job of load data, associating a snapshot acquisition job and a data curation job with the load data, and further associating a job storing the curated data with the data curation job is configured.

The data analysis server 32 includes a processing unit and a display device, and the processing unit displays a plurality of job objects in the node list part of the display device. If the user selects one of a plurality of job objects displayed on the display device and drops it onto the workflow display area, the workflow definition information of the data preparation process is generated.

A plurality of job objects include a load data object (Load data) for reading data from the raw data bucket, a data curation object (Data Curation) for curating the data for the data of the associated job object, a storage job object (Store) for storing the data for the data of the associated job object, and a snapshot acquisition job object (Get Snapshot) for acquiring the snapshot of the data for the data of the associated job object.

As described above, since the workflow can be created visually, even the user who is not familiar with server management and data storage management and conducts data analysis can easily acquire the snapshot for the curated data bucket or the raw data bucket corresponding to the learned data model and perform re-analysis on the past learned data model.

FIG. 20 is a diagram illustrating an example of a data configuration management GUI according to an embodiment. A display example of FIG. 20 is an example in which the data relation diagram (chronological) according to the embodiment in FIG. 6 is displayed. The display is displayed on a display device of the client computer 31 and a display device of the data analysis server 32. With this display, the user can easily understand the snapshots (consistent snapshot group) of the raw data bucket, the curated data bucket, and the learned data model acquired at the same time.

Figure 21:
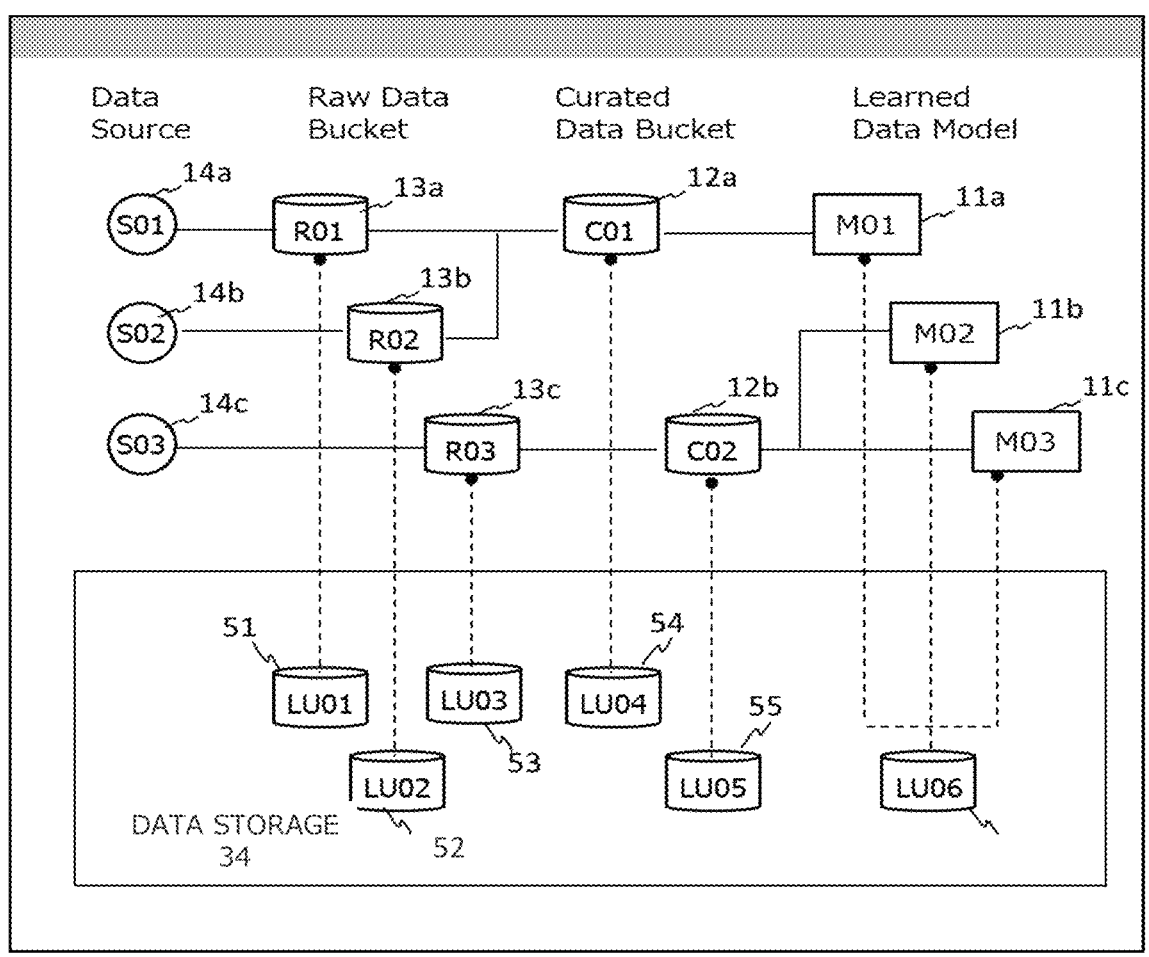
FIG. 21 is a diagram illustrating an example of a data configuration management GUI and a data relation diagram (configuration diagram) according to an embodiment.

FIG. 21 is a diagram illustrating an example of the data configuration management GUI according to an embodiment. This GUI is an example in which the data relation diagram (configuration diagram) according to the embodiment of FIG. 5 is displayed. This display is displayed on the display device of the client computer 31 and the display device of the data analysis server 32. With this display, the user can check which LU on the data storage corresponds to the raw data bucket, the curated data bucket, and the learned data model on the data analysis server and easily understand the snapshot of which LU has to be acquired when the snapshot of the raw data bucket, the curated data bucket, or the like is acquired.

As described above, according to the present embodiment, when the learned data model generation flow is started, the acquisition of the snapshot of the raw data bucket, the acquisition of the snapshot of the curated data bucket at the time of the creation of the curated data, and the acquisition of the snapshot of the learned data model are performed, and thus the re-examination of the learned data model or the evidence search can be performed.

At a time point at which the learned data model is created and updated, only the snapshot of the raw data bucket that matches the data attribute of the learned data model may be acquired. For example, if the attribute of the learned data model is a file, the snapshot is acquired only for the data stored in file storage among the corresponding raw data buckets.

Also, the snapshot of the raw data bucket may be acquired periodically. At this time, a specific data source (a sensor, a camera, or the like) may be designated, and the snapshot may be acquired only for the associated raw data bucket.

In a case in which the application side determines that a recorded image by a specific camera has a value, it can cope with a use case such as the case of running a snapshot so that the record is not lost.

Further, the relation with the raw data bucket or the curated data on the data analysis server which is necessary to create the learned data model is managed, and the correspondence relation of the raw data bucket or the curated data bucket and the LU on the data storage is managed, and thus it is possible to store data for data having influence on creation and update of the learned data model.

As described above, the AI application user can realize relearning of the learned data model, evidence search, or the like with reference to the past data which is the basis of the learned data model.

What is claimed is:

1. A data management system, comprising:
a data analysis server that generates curated data from raw data of various kinds of data, learns the curated data, and generates a learned data model;

a data storage including a first storage area that stores the learned data model, a second storage area that stores the curated data, and a third storage area that stores the raw data; and a storage management server that manages the data storage, wherein the data analysis server:

manages first data configuration information for managing a correspondence of the learned data model, a raw data bucket that stores the raw data for generating the learned data model, and a curated data bucket that stores the curated data for generating the learned data model;

manages second data configuration information for managing correspondences of the learned data model and the first storage area, the curated data bucket and the second storage area, and the raw data bucket and the third storage area;

sends an instruction to acquire snapshots of the second storage area that stores the curated data for generating the learned data model and the third storage area that stores the raw data for generating the learned data model to the data storage via the storage management server when the learned data model is generated;

receives storage configuration management information and snapshot management information from the storage management server, and generates third data configuration information for managing snapshot acquisition times of the first storage area, the second storage area, and the third storage area; and a data management relation is generated on the basis of the first data configuration information, the second data configuration information, and the third data configuration information.

2. The data management system according to claim 1, wherein
the raw bucket is a data lake,
the curated data bucket is a learning data set, and
the learned data model is a learning model.

3. The data management system according to claim 1, wherein the data configuration relation generated by the data analysis server indicates:
a relation of the raw data bucket, the curated data bucket, and the learned data model,
relations of the raw data bucket and the third storage area, the curated data bucket and the second storage area, and the learned data model and the third storage area, and
a relation with at least one snapshot of the first storage area, the second storage area, and the third storage area.

4. The data management system according to claim 2, wherein
the data analysis server receives storage configuration management information and snapshot management information from the storage management server, and generates third data configuration information for managing snapshot acquisition times of the first storage area, the second storage area, and the third storage area, and
at least two of snapshots of the learned data model, the curated data bucket, and the raw data bucket acquired at the same time are managed as a consistent snapshot group on the basis of the second data configuration information and the third data configuration information.

5. The data management system according to claim 2, wherein
the data analysis server includes a processing unit and a display device,
the processing unit displays a plurality of job objects in a node list part of the display device, and
workflow definition information of a data preparation process is generated by selecting the job object from the node list part and dropping the job object onto a workflow display area.

6. The data management system according to claim 5, wherein the plurality of job objects displayed in the node list part include:
a load data object for reading data from the raw data bucket,
a data curation object for curating, for data of an associated job object, the data,
a storage job object of storing, for data of an associated job object, the data, and
a snapshot acquisition job object for acquiring, for data of an associated job object, a snapshot of the data.

7. A data management system, comprising:
a data analysis server that generates curated data from raw data of various kinds of data, learns the curated data, and generates a learned data model;
a data storage including a first storage area that stores the learned data model, a second storage area that stores the curated data, and a third storage area that stores the raw data; and
a storage management server that manages the data storage,
wherein the data analysis server:
manages first data configuration information for managing a correspondence of the learned data model, a raw data bucket that stores the raw data for generating the learned data model, and a curated data bucket that stores the curated data for generating the learned data model;
manages second data configuration information for managing correspondences of the learned data model and the first storage area, the curated data bucket and the second storage area, and the raw data bucket and the third storage area;
sends an instruction to acquire snapshots of the second storage area that stores the curated data for generating the learned data model and the third storage area that stores the raw data for generating the learned data model to the data storage via the storage management server when the learned data model is generated;
receives storage configuration management information and snapshot management information from the storage management server, and generates third data configuration information for managing snapshot acquisition times of the first storage area, the second storage area, and the third storage area, and
generates a data chronological relation on the basis of the first data configuration information, the second data configuration information, and the third data configuration information.

8. The data management system according to claim 7, wherein the data chronological relation generated by the data analysis server indicates:
a relation of the raw data bucket, the curated data bucket, and the learned data model,
relations of the raw data bucket and the third storage area, the curated data bucket and the second storage area, and the learned data model and the third storage area, and a relation with snapshot acquisition times of the first storage area, the second storage area, and the third storage area.

9. A data management method in a data management system including a data analysis server that generates curated data from raw data of various kinds of data, learns the curated data, and generates a learned data model, a data storage including a first storage area that stores the learned data model, a second storage area that stores the curated data, and a third storage area that stores the raw data, and a storage management server that manages the data storage, the data management method comprising:

managing, by the data analysis server, a correspondence of the learned data model, a raw data bucket that stores the raw data for generating the learned data model, and a curated data bucket that stores the curated data for generating the learned data model as first data configuration information;

managing, by the data analysis server, second data configuration information for managing correspondences of the learned data model and the first storage area, the curated data bucket and the second storage area, and the raw data bucket and the third storage area;

sending, by the data analysis server, an instruction to acquire snapshots of the second storage area that stores the curated data for generating the learned data model and the third storage area that stores the raw data for generating the learned data model to the data storage via the storage management server when the learned data model is generated;

receiving, by the data analysis server, storage configuration management information and snapshot management information from the storage management server, and generating third data configuration information for managing snapshot acquisition times of the first storage area, the second storage area, and the third storage area; and managing at least two of snapshots of the learned data model, the curated data bucket, and the raw data bucket acquired at the same time as a consistent snapshot group on the basis of the second data configuration information and the third data configuration information.

10. The data management method according to claim 9, wherein the data analysis server notifies, if an instruction to generate the learned data model is received, the storage management server of a snapshot acquisition instruction of the third storage area corresponding to the referred raw data bucket with reference to the raw data bucket, the storage management server instructs the data storage to acquire the snapshot of the third storage area, the data storage acquires the snapshot of the third storage area and gives a notification to the storage management server, the data analysis server executes curation of the referred raw data bucket if the acquisition notification of the snapshot of the referred third storage area is received from the storage management server, data obtained by executing the curation is stored in the curated data bucket, and an instruction to acquire a snapshot of the second storage area corresponding to the curated data bucket is given to the storage management server, and the data storage acquires the snapshot of the second storage area in accordance with the instruction from the storage management server and gives a notification to the storage management server.

* * * * *